Jan. 31, 1967   G. V. COPLAND   3,302,104
APPARATUS FOR THE LOCATION OF AXIAL AND RADIAL DISCONTINUITIES
IN TUBING USING A ROTATING DETECTOR
INCLINED TO THE TUBING AXIS
Filed Nov. 18, 1963

INVENTOR
GEORGE V. COPLAND

BY Burns, Doane, Benedict, Swecker & Mathis
ATTORNEY ic source in a plane inclined to the tubing axis. Detection of flux changes from the source excitation will then provide an indication of both radial and circumferential adjacent discontinuities in the casing, even though the source is rotated in a plane that is stationary relative to the casing.

United States Patent Office 3,302,104
Patented Jan. 31, 1967

3,302,104
APPARATUS FOR THE LOCATION OF AXIAL AND RADIAL DISCONTINUITIES IN TUBING USING A ROTATING DETECTOR INCLINED TO THE TUBING AXIS
George V. Copland, Duncan, Okla., assignor to Halliburton Company, Duncan, Okla., a corporation of Delaware
Filed Nov. 18, 1963, Ser. No. 324,474
5 Claims. (Cl. 324—37)

The present invention relates to a method and apparatus for detecting and locating discontinuities in pipe or tubing, particularly metallic casing employed to line a bore hole. More specifically, the present invention relates to a new and improved apparatus for detecting and locating casing collars that connect adjoining sections of such tubing, which detection can be accomplished while the apparatus is either stationary or moving along the tubing.

Various inspection tools and systems have been devised in the past to be inserted in a bore hole casing, and the like, to detect deformities and to locate casing joints. Most of these devices employ magnetic scanners of one sort or another, the magnetic flux of which is passed through a detection coil and through the casing wall such that a discontinuity in the casing wall produces a change in the magnetic flux distribution and induces a signal in the detection coil. It will be appreciated that any current induced in the coil results from a change in flux and, thus, the scanner must be moved along the casing wall surface in order to detect peripheral discontinuities therein.

One form of such prior art scanning devices includes a permanent bar magnet having iron cores extending from both poles such that the combination extends substantially across the diameter of the inspecting tool and the casing to be inspected. A detection coil is wound around one of the iron cores and the magnetic flux path extends from one core through the casing wall to the other core. Other variations of such prior art scanning devices include a pair of longitudinally spaced permanent magnets arranged axially on either side of the detection coil to provide opposing magnetic fields at the location of the detection coil. As a casing wall discontinuity is approached by this latter type of device, the flux paths of the permanent magnets will be successively changed with resultant change of flux in the detection coil. Other casing detectors employ rotating magnets or magnetic fields which can provide output signals indicating longitudinal flaws or slits in a casing when the sonde is stationary. These devices, however, are not effective to indicate discontinuities in a radial casing plane, such as a collar or the end of a casing section, except when the sonde is moving.

Inspection instruments having scanners of above described types are generally referred to as rate type inspection instruments, since their operation is dependent on movement at a relatively high rate of speed. That is to say, rotating scanners making a peripheral scan will detect longitudinal (vertical) discontinuities; however, neither the rotating scanner nor the stationary scanner can make an axial scan to detect lateral discontinuities such as the end of a bore hole casing unless the inspection instrument is moved along the casing at a relatively high rate of speed. When such inspection instruments are moved at a relatively low rate of speed, the rate of change of flux intensity is proportionately small and any signals generated by the instrument will be relatively weak.

The present invention provides for scanning the casing in a predetermined pattern having axial and circumfer- While the apparatus of the present invention may be used to make many types of inspection in bore hole casings, it is primarily directed towards a device for locating the ends of adjacent casings that are joined by a casing collar. Although there are certain advantages to moving the inspection tool along the bore hole casing at a relatively high rate of speed, more accurate determination of the collar location can be made at relatively slow rates of ascent or descent and, in certain cases, it is desirable to be able to have the inspection tool indicate such location while the inspection tool remains stationary adjacent thereto. Of course, with the rate type inspection tools of the prior art, such stationary inspections cannot be made.

It is, then, an object of the present invention to provide an improved method and apparatus for employment in metallic bore hole casings and the like.

Another object of the present invention is to provide a magnetic inspection instrument that can make a vertical or axial scan over a portion of a tube or bore hole casing while the inspection instrument remains in a stationary position.

Still another object of the present invention is the provision of the magnetic collar locator that may be operated during low rates of ascent or descent in a metallic bore hole casing.

It is still another object of the present invention to provide a novel and improved scanning device for employment in a casing collar locator.

When a magnet is moved along or adjacent a metallic surface having a discontinuity therein, there will result a change in the flux intensity as the magnet passes over the discontinuity, which change may be detected by a detection coil placed in the magnetic circuit. If, however, such a scanner is rotated in a radial plane of the casing adjacent its end, which is a discontinuity in a radial plane, obviously the discontinuity will not be detected unless the scanner is moving axially in the casing at the time.

The present invention provides a continuous axial and radial scan of the casing by inclining the scanner axis relative to the sonde axis. Preferably, the system employs a tilted rotating magnetic assembly carrying a sensing coil responsive to change in flux level produced by environmental discontinuities. Such a system achieves precision location of casing section ends without demanding accompanying movement of the scanner housing. The output signal of the assembly is well adapted for transmission to surface recorders or indicators by conventional logging transmission systems.

Other objects, advantages and features of the present invention will be readily apparent to those skilled in the art from the following detailed description when taken in conjunction with the accompanying drawings in which.

Figure 1:
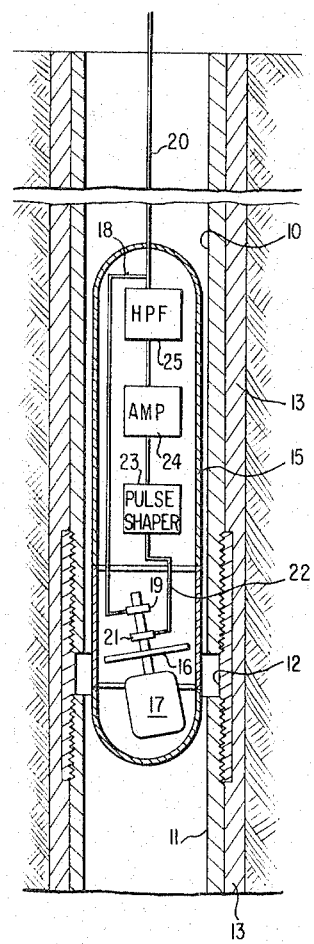
FIGURE 1 is a cross-sectional view of a bore hole casing which illustrates an inspection instrument of the present invention inserted therein adjacent a typical casing collar.

In FIGURE 1 there is shown in cross-section a typical bore hole casing in which has been inserted an inspecting tool of a type contemplated in the present invention. The bore hole is lined by a series of casing sections such as 10 and 11 arranged adjacent one another and spaced apart slightly in casing collar 12, internally threaded to receive the externally threaded ends of the respective sections. The casing is suitably supported and may be bonded to the formation by cement 13. To determnie the position of collar 12 within the bore hole, inspecting instrument 15 is lowered therein. The sonde is provided wtih a magnetic scanner 16 that is arranged for rotation about an axis that intersects, at a small angle, the axis of inspecting tool 15. The magnetic scanner 16 is of a circular type having a small circumferential gap, the magnetic flux of which extends to the adjacent casing wall as will be more thoroughly described below. Scanner 16 is also provided with a detection coil (not shown in FIGURE 1) in which a signal is induced by a change in the flux as the gap of scanner 16 passes across a discontinuity in the casing wall. The position of the collar 12 is determined from the scanner signal generated where it is adjacent the end of either casing sections 10 or 11.

In order to provide continuous rotation of scanner 16, the scanner is mounted on the shaft of electric motor 17. The power for the motor is supplied along conductor hoisting cable 20 through conductors 18 to slip rings 19 mounted on the shaft of motor 17. Appropriate connection is made to the motor windings from the slip rings. Signals from the detection coil are carried via slip rings 21 and lead 22 to pulse shaper 23, if the latter is desirable in the specific system. The scanner signal is coupled to amplifier 24 to feed line 20 through high pass filter 25. An appropriate recording or display system is provided on the surface.

Figure 2:
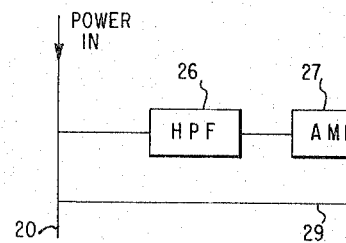
FIGURE 2 is a block diagram of a display system to be used with the present invention.

In FIGURE 2, there is shown a typical display system for employment with the present invention in which the signal generated by the inspection tool is received from conductor hoisting cable 20, amplified by amplifier 27, and presented at the vertical plates of oscilloscope 28. As explained above, power for motor 17 in FIGURE 1 is supplied along conductor hoisting cable 20 and high pass filter 26 provided to isolate amplifier 27 and the vertical plates of oscilloscope 28 from the power source just as high pass filter 25 in FIGURE 1 is provided to isolate amplifier 24 and pulse shaper 23 from the power source.

A direct current supply and motor may also be used, however, alternating current is usually more convenient. The power source may then provide any frequency that is convenient, such as 60 cycle line current in which case motor 17 may be of a synchronous type. A synchronizing signal is derived from cable 20 via connector 29 for application to the oscilloscope sweep generator, through a frequency divider, if required. It is preferred that each sweep of the oscilloscope trace represent one revolution of the scanner in the down hole tool.

It will be appreciated that the circuits in FIGURES 1 and 2 have been generally described and indicated according to their functions and that the respective filters, amplifiers, and pulse shapers may be of such prior art circuitry as satisfies the requirements of a down hole logging instrument. For example, the particular circuitry of pulse shaper 23 can be chosen to provide whatever pulse shape may be required by the specific conditions imposed upon the logging system. It also will be understood that amplifier 24 in FIGURE 1 not only provides proper amplification of the pulse signal, but also matches the cable line impedance.

Figure 3:
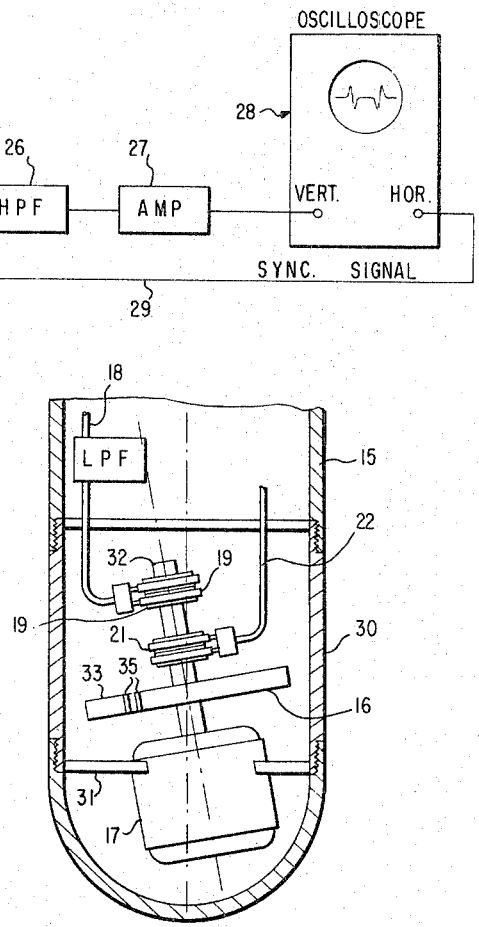
FIGURE 3 is a detailed cross section of a portion of the inspection instrument shown in FIGURE 1.
Figure 4:
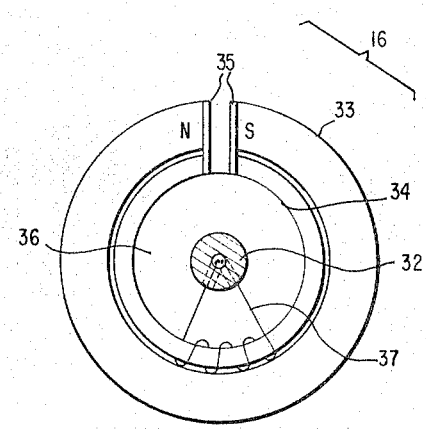
FIGURE 4 is a sectional view taken from FIGURE 3 which illustrates the configuration of the magnetic scanner of the present invention.

To more fully disclose the specific scanning device contemplated to carry out the present invention, reference is now made to FIGURE 3, which is a cross-sectional view of the portion of the inspection tool, and to FIGURE 4 which is a section taken from FIGURE 3 and enlarged to show the preferred scanning magnet and detection coil. As shown in FIGURE 3, inspection tool 15 is provided with a non-conductive window 30 that extends completely around the periphery of inspection tool 15 adjacent magnetic scanner 16. Where the housing is of similar material, obviously a separate window section would be unnecessary. As was described above, magnetic scanner 16 is mounted for rotation on shaft 32 of motor 17 and motor 17 is so positioned within inspection tool 15 (as by mounting brace 31) that the scanner's axis of rotation is at an angle with the axis of the inspection instrument. This angle is approximately 5° to 10° although it may be varied depending upon the amount of vertical or axial scan desired.

Scanner 16 is illustrated in FIGURE 4 and includes circular permanent magnet 33 having radial north and south pole faces which define a gap therein. Iron core 34 is mounted within the inner surface of magnet 33, core 34 having a circular configuration for this purpose. Core 34 is also provided with radially extended pole pieces 35 which reside in the gap of magnet 33 adjacent the respective north and south pole faces and define a gap in core 34. The purpose of core 34 is to provide a path for the magnetic flux through detection coil 37 wound about core 34 and the entire configuration is supported on non-magnetic disc 36 attached to shaft 32 of motor 17.

As indicated in FIGURES 3 and 4, detection coil 37 is connected via slip rings 21 to lead 22 which in turn carries the signal from the detection coil to pulse shaper 23 as indicated in FIGURE 1. Also shown in FIGURE 3 are motor power supply leads 18 which connect to the armature windings thereof through slip rings 19 in a conventional manner as will be understood by one skilled in the art. In the embodiment shown in FIGURE 3 where motor 17 is located below scanner 16, it is necessary to convey power to motor 17 through slip rings 19 so that conductor 18 will not pass between scanner 16 and the casing wall. However, in another embodiment, motor 17 can be placed above scanner 16 with conductor 18 connected directly to motor 17 thereby eliminating the need for slip rings 19.

Returning again to FIGURE 4, it will be apreciated that the extended pole pieces 35 and iron core 34 tend to serve as a return path for the magnetic flux between the respective north and south poles of magnet 33. However, because of the close proximity of the respective north and south poles, there will also be substantial flux in the gap between the respective extended pole pieces 35. This scanning device, then, may be viewed as operating with two magnetic circuits in parallel, each of which has approximately the same magnetic reluctance. If a magnetic object were placed in the vicinity of the gap, the reluctance across the gap would be decreased relative to the reluctance of the parallel path through iron core 34.

When a magnetically permeable metal surface, such as a casing wall, is adjacent the gap of magnet 33, the magnetic circuit will have an increase in flux in that portion of the circuit represented by the metallic surface with a corresponding decrease in flux in the other conductor represented by iron core 34. As the gap scans the metallis surface during rotation of the circular magnet 33, a discontinuity in that metallic surface will cause a decrease in the external flux in the former magnetic conductor with an increase in flux resulting in iron core 34. The increase of flux intensity in iron core 34 will in turn induce a current pulse in detection coil 37.

Referring again to FIGURE 1, inspection tool 15 is illustrated as being positioned with the magnetic scanner 16 adjacent the lower end of casing section 10 such that the gap of magnetic scanner 16 crosses this lower end twice during one revolution due to the inclination of the axis of rotation of the scanner. At each instance of crossing, a current will be induced in the detection coil and the oscilloscope pattern resulting therefrom will indicate two pulses as illustrated in FIGURE 2, the horizontal sweep being synchronized to represent one revolution of the scanner. Since the inspection tool of the present invention can detect the end of a casing wall in this manner even when the sonde is stationary, it will be appreicated that very accurate measurements of the location of the ends of the respective casings can be achieved. In addition to finding the ends of the casing, the present invention can also be used to find perforations or vertical splits in the casing walls, which would provide a different display trace on oscilloscope 28 than would be obtained from the casing end. That is to say, the scanning device of the present invention can be used to locate a number of different types of discontinuities by proper interpretation of the display pattern.

It will be appreciated that the higher the rate of rotation, the more rapid will be the rate of change of the flux intensity at a discontinuity and, therefore, the larger the signal produced thereby. In the present invention, a rotation rate of 1800 r.p.m. has been found to be satisfactory. At such an angular velocity, the pulse width would be of the order of a few milliseconds depending upon the configuration of the discontinuities being scanned. The spectrum frequencies of such pulses are well within the range of standard logging transmission systems. It will be understood that pulse shaper 23 in FIGURE 1 can be designed to modify the output wave form or achieve a particular pulse width as may be desired.

In essence, the scanning device of the present invention achieves both an axial scan and a peripheral scan and such a two dimensional scanning capability is in no way dependent upon movement of the inspection tool along the tubing or bore hole casing. It will be appreciated that the scanning device of the present invention can be employed to locate the ends of the casing walls when the scanner is moved at an extremely slow velocity along the casing and that the scanner also can be effectively employed when it is to be moved along the casing at a relatively high velocity.

While the present invention has been described in conjunction with a preferred embodiment, it is to be understood that modifications and variations may be made without departing from the spirit and scope of the invention as understood by those skilled in the art. It will be further understood that such modifications and variations are to be considered to be within the spirit and scope of the invention as described and claimed.

I claim:

1. Apparatus of detecting discontinuities in metal tubing comprising a housing receivable therein, a source of magnetic flux having adjacent pole pieces adapted to distribute flux into the tubing wall, detection means operative to provide a signal in response to a change in said flux, and motive means in the housing to move said source in a predetermined pattern having axial and circumferential components along said tubing to move each pole piece both axially and circumferentially with respect to the tubing whereby adjacent axial and radial discontinuities in said tubing produce detection signals independently of movement of the housing.

2. Apparatus for detecting discontinuities in metal tubing comprising a cylindrical housing receivable therein, magnetic means rotatably mounted within said housing to distribute magnetic flux into said tubing wall, detection means mounted within said housing to provide a signal in response to a change in said flux, and motive means operative to rotate said magnetic means about an axis inclined at an angle to the axis of the housing such that passage of said flux across radial and circumferential discontinuities in said tubing produces a change in said flux.

3. Apparatus for detecting discontinuities in metal tubing comprising a cylindrical housing receivable therein, magnetic means rotatably mounted within said housing to distribute magnetic flux into said tubing wall, a coil mounted within said housing to intercept a portion of said flux to provide a signal in response to a change in said flux distribution, and motive means to rotate said magnetic means about an axis inclined at an angle to the axis of the housing to achieve both an axial and peripheral scan relative thereto, such that passage of said flux across a discontinuity in said metal tubing produces a change in said flux.

4. Apparatus for detecting discontinuities in metal tubing comprising an elongated housing receivable therein, said elongated housing having a longitudinal axis, a curved permanent magnet rotatably mounted within said housing and having pole faces defining a gap to distribute magnetic flux into said tubing wall, a coil mounted within said housing to provide a signal in response to a change in said flux, and motive means to rotate said magnet and said coil about an axis inclined at an angle to the longitudinal axis of said housing such that passage of said flux across radial and circumferential discontinuities in said tubing produces a change in said flux.

5. Apparatus for detecting discontinuities in metal tubing comprising an elongated housing receivable therein, said elongated housing having a longitudinal axis, a permanent magnet of incomplete annular shape having pole faces defining a radial gap, a ferromagnetic core of incomplete annular shape within said permanent magnet and having pole pieces extending radially therefrom to define a gap in said core, said pole pieces residing adjacent said pole faces, a detection coil wound about said ferromagnetic core such that changes in flux in said core provides a signal in said coil, and means mounting said magnet and said core in said housing for rotation about an axis inclined at an angle to the longitudinal axis of said housing such that passage of said magnet gap across radial and circumferential discontinuities in said tubing produces a signal in said coil.

References Cited by the Examiner
UNITED STATES PATENTS

| 2,067,804 | 1/1937 | Thorne | 324—37 |
| 2,527,170 | 10/1950 | Williams | 324—34 |
| 3,015,063 | 12/1961 | Ownby | 324—34 |

WALTER L. CARLSON, *Primary Examiner.*

R. J. CORCORAN, *Assistant Examiner.*